(12) United States Patent
Higurashi

(10) Patent No.: US 6,879,772 B1
(45) Date of Patent: Apr. 12, 2005

(54) AUDIO AND VIDEO SIGNAL RECORDING APPARATUS AND METHOD HAVING A FUNCTION OF INFORMING USER WHEN THE SIGNAL IS PROTECTED FROM RECORDING

(75) Inventor: Seiji Higurashi, Fuchu (JP)

(73) Assignee: Victor Company of Japan, Ltd., Kanagawa-ken (JP)

( * ) Notice: Subject to any disclaimer, the term of this patent is extended or adjusted under 35 U.S.C. 154(b) by 0 days.

(21) Appl. No.: 09/573,813

(22) Filed: May 19, 2000

(30) Foreign Application Priority Data

May 25, 1999 (JP) .................................. 1999-144572
Mar. 31, 2000 (JP) .................................. 2000-097419

(51) Int. Cl.$^7$ .............................................. H04N 5/76
(52) U.S. Cl. .............................. 386/94; 360/60; 380/201
(58) Field of Search ..................... 386/1, 94; 360/60; 380/201–203; H04N 5/76, 5/781, 7/167, 5/91

(56) References Cited

U.S. PATENT DOCUMENTS

| | | | | |
|---|---|---|---|---|
| 5,337,157 A | * | 8/1994 | Nakata .......................... | 386/94 |
| 5,479,266 A | * | 12/1995 | Young et al. ................... | 386/83 |
| 5,659,613 A | * | 8/1997 | Copeland et al. ............. | 380/202 |
| 5,825,968 A | | 10/1998 | Nishigaki et al. .............. | 386/94 |
| 5,867,579 A | * | 2/1999 | Saito ............................ | 705/57 |
| 5,923,486 A | * | 7/1999 | Sugiyama et al. ............ | 360/60 |
| 5,960,151 A | * | 9/1999 | Takahashi ..................... | 386/94 |
| 6,067,398 A | * | 5/2000 | Sato ............................ | 386/46 |
| 6,141,488 A | * | 10/2000 | Knudson et al. .............. | 386/83 |
| 6,550,008 B1 | * | 4/2003 | Zhang et al. ................. | 713/155 |
| 6,618,335 B2 | * | 9/2003 | Tanaka et al. ............. | 369/53.21 |
| 2002/0021807 A1 | * | 2/2002 | Saito ........................... | 380/201 |

FOREIGN PATENT DOCUMENTS

| | | |
|---|---|---|
| EP | 0913997 A2 | 5/1999 |
| JP | 10257428 | 9/1998 |
| JP | 11032266 | 2/1999 |

OTHER PUBLICATIONS

Patent Abstracts, of Japan, vol. 1999, No. 5, May 31, 1999 & JP 11 032266 A (Victor Co of Japan Ltd), Feb. 2, 1999.

* cited by examiner

*Primary Examiner*—Thai Tran
(74) *Attorney, Agent, or Firm*—Jacobson Holman PLLC

(57) ABSTRACT

Auxiliary data carried by a video signal which is now being broadcast is detected to decide whether or not the video signal is protected from recording by copyright. The video signal is recorded on a storage medium when it is not protected from recording. On the other hand, a predetermined information is recorded on the storage medium when the video signal is protected from recording. The information suggests that the video signal has not been recorded due to copyright protection. Either the video signal or the predetermined information is retrieved from the storage medium and displayed on a monitor screen when retrieved from the storage medium.

9 Claims, 6 Drawing Sheets

TV PROGRAM SET TO BE RECORDED ON ∗∗/∗∗/∗∗, AT ∗∗:∗∗ TO ∗∗:∗∗, CHANNEL ∗∗ HAS NOT BEEN RECORDED DUE TO COPYRIGHT PROTECTION.

FIG.3

TV PROGRAM YOU ARE TRYING TO
PRESET RECORDING ON CHANNEL
* * IS PROTECTED BY COPYRIGHT

FIG.6

AUDIO AND VIDEO SIGNAL RECORDING APPARATUS AND METHOD HAVING A FUNCTION OF INFORMING USER WHEN THE SIGNAL IS PROTECTED FROM RECORDING

BACKGROUND OF THE INVENTION

The present invention relates to recording audio and video signals transmitted by digital broadcasting. Particularly, this invention relates to an audio and video signal recording apparatus having a preset recording function (presetting the preset data of TV programs which will be broadcast later, such as, TV channel, time, etc.) of recording audio and audio signals, such as, TV programs which will be broadcast later.

Digital broadcasting via communications satellite (CS) has been very popular. Not only this, digital broadcasting via broadcasting satellite (BS), ground wave or cable is on drawing boards to start in a few years.

Digital broadcasting transmits TV programs with copy information including recording inhibit information for TV programs which are inhibited from recording to secure copyrights thereon, due to the fact that digital signals are hardly degraded no matter how many times the signals are recorded.

Conventional recording apparatus generate a copy guard signal for such TV programs on reception to allow viewers TV viewing but inhibit recording.

Conventional recording apparatus, however, have a drawback in that viewers often guess wrong that recording has been set mistakenly or the apparatus has been out of order.

Viewers tend to make such a wrong guess because a conventional apparatus inevitably starts recording a TV program that has been protected from recording, which results in failure of recording and reproduction, due to the fact that conventional apparatus allow viewers preset recording even for TV programs that carries the recording inhibit information.

The inventor has proposed a technique of TV-program recording inhibition for TV programs protected from recording by copyright, which is disclosed in Japanese Unexamined-Patent Publication No. 1999 (11)-32266.

In this technique, viewers preset TV-program recording while watching an on-screen program guide pre-stored in a digital broadcasting receiver.

This technique, however, also has the same drawback in that viewers guess wrong that recording has been set mistakenly or the receiver has been out of order. Viewers make such a wrong guess when recording inhibit information has not been recorded on the program guide or they preset recording without reference to the on screen-program guide.

SUMMARY OF THE INVENTION

A purpose of the present invention is to provide an apparatus and a method of audio and video signal recording with a function to inform viewers that a TV program has not been recorded because it is protected by copyright, no matter how viewers preset recording, to avoid viewer's wrong guess such that recording has been set mistakenly or the recording apparatus is out of order.

The present invention provides a recording apparatus including: a detector to detect auxiliary data carried by at least a video signal which is now being broadcast to decide whether or not the video signal is protected from recording; a recorder to record either the video signal or a predeter mined information on a storage medium, the information suggesting that the video signal has not been recorded because it is protected from recording; and control means for controlling at least the recorder so that the video signal is recorded on the storage medium when the video signal is not protected from recording, on the other hand, the information is recorded on the storage medium when the video signal is protected from recording.

Furthermore, the present invention provides a recording apparatus including: a detector to detect auxiliary data carried by at least a video signal which is now being broadcast to decide whether or not the video signal is protected from recording; a recorder to record the video signal on a storage medium when the video signal is not protected from recording; and means for outputting a predetermined information to a monitor screen or a speaker when the video signal is protected from recording, the information suggesting that the video signal has not been recorded because it is protected from recording, the monitor screen displaying or the speaker giving off the information when there is an attempt to reproduce the video signal from the storage medium.

Moreover the present invention provides a recording method. Auxiliary data carried by at least a video signal which is now being broadcast is detected to decide whether or not the video signal is protected from recording. Either the video signal or a predetermined information is recorded on a storage medium. The first information suggests that the first video signal has not been recorded because it is protected from recording. The recording is controlled so that the video signal is recorded on the storage medium when the video signal is not protected from recording, on the other hand, the information is recorded on the storage medium when the video signal is protected from recording.

Furthermore, the present invention provides a recording method. Auxiliary data carried by at least a video signal which is now being broadcast is detected to decide whether or not the video signal is protected from recording. The video signal is recorded on a storage medium when the video signal is not protected from recording. On the other hand, a predetermined information is output to a monitor screen or a speaker when the video signal is protected from recording. The information suggests that the video signal has not been recorded because it is protected from recording. The monitor screen displays or the speaker gives off the information when there is an attempt to reproduce the video signal from the storage medium.

BRIEF DESCRIPTION OF DRAWINGS

FIG. 3 illustrates an on-screen message for a TV program which has been protected from recording;

FIG. 6 illustrates another on-screen message for a TV program which has been protected from recording.

DETAILED DESCRIPTION OF PREFERRED EMBODIMENTS

Preferred embodiments according to the present invention will be disclosed with reference to the attached drawings.

As already stated, digital broadcasting transmits TV programs with copy information because digital signals are hardly degraded no matter how many times the signals are recorded.

The copy information includes copy generation management system (CGMS) data that allows viewers watching only or allows recording only once, etc., to secure copyrights on particular TV programs.

The present invention utilizes the CGMS data for effective TV-program preset recording.

Figure 1:
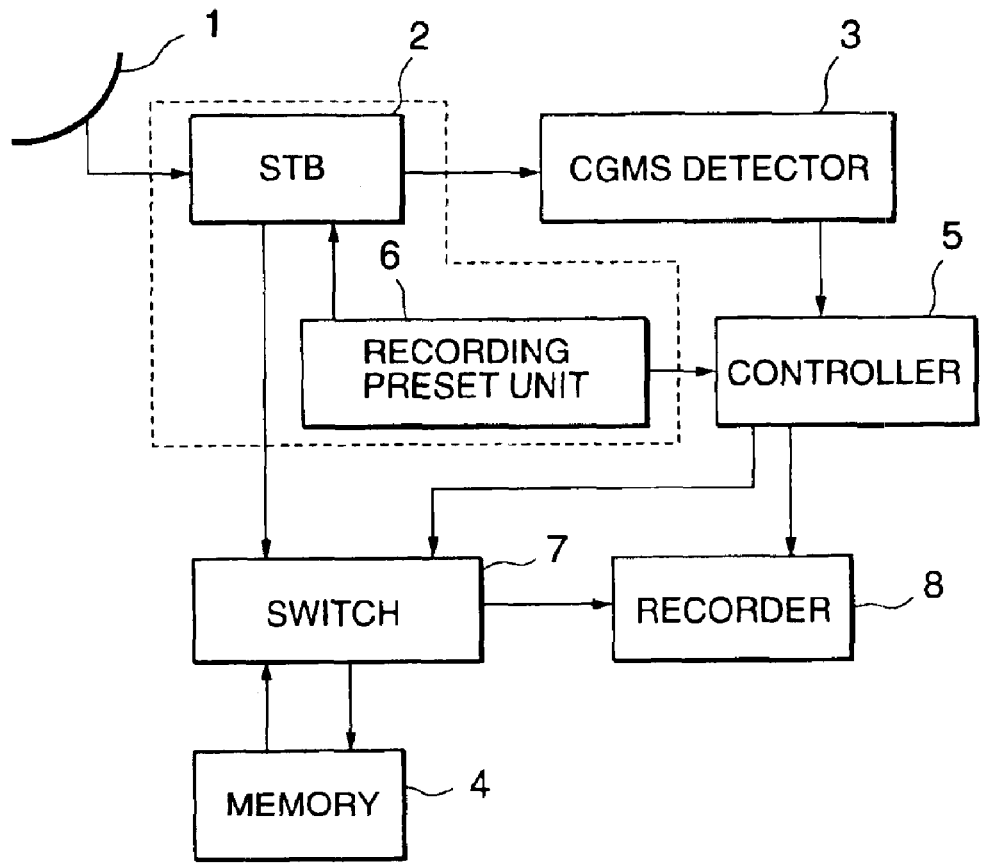
FIG. 1 shows a block diagram of an audio and video recording apparatus as the first preferred embodiment according to the present invention.
Figure 2:
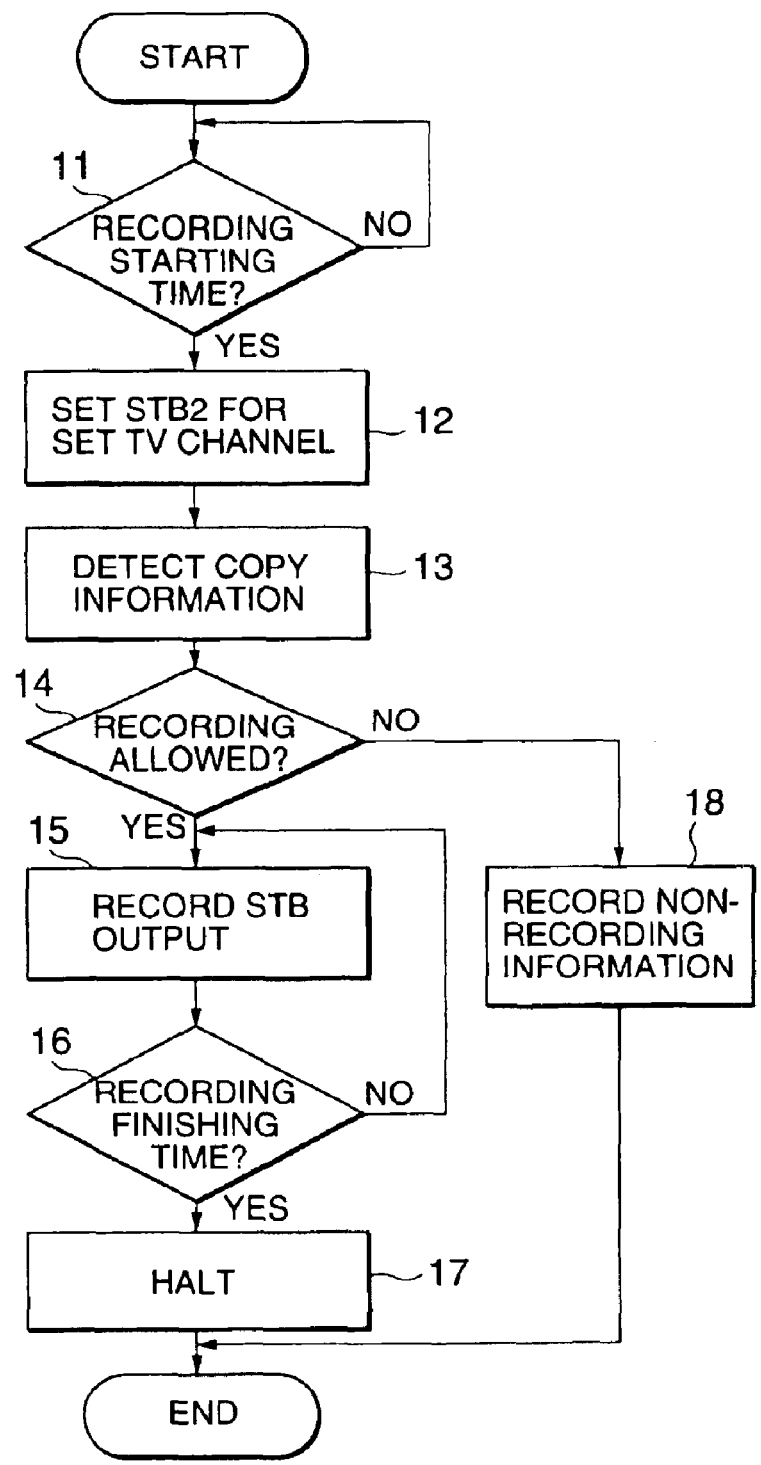
FIG. 2 is a flow chart of TV-program recording process of the audio and video recording apparatus shown in FIG.

The first embodiment of an audio and video signal receiving apparatus according to the present invention is disclosed with reference to a block diagram and a flow chart shown in FIGS. 1 and 2, respectively.

The audio and video signal recording apparatus shown in FIG. 1 is provided with a recording preset unit 6 that allows a viewer TV-program preset recording and stores the preset data, such as, recording starting and finishing time, a TV channel, and so on.

When it is the preset recording starting time (STEP S11), the recording preset unit 6 sets a digital broadcasting receiver 2, a set-top-box (STB), to be tuned to the preset TV channel (STEP S12), and feeds a control signal to a controller 5 to start recording.

An electromagnetic wave carried by the 12-GHz band, for example, via a communications satellite is received by the STB 2 via an antenna 1 for demodulation, error-correction and separation into, for example, MPEG2-compressed video and audio data and other auxiliary data.

The STB 2 and recording preset unit 6 (surrounded by a dot line) may be separated from the audio and video recording apparatus shown in FIG. 1.

In this case, when it is the preset recording starting time (STEP S11), the recording prest unit 6 sets the STB 2 to be tuned to the preset TV channel (STEP S12), turns on the recording apparatus and feeds a control signal to the controller 5 to start recording video and audio data (TV program) transmitted from the separate STB 2.

The video and audio data, and the auxiliary data are fed to a switch 7. Among the auxiliary data, copy information indicating whether recording is allowed or not is fed to a CGMS detector 3 for deciding whether recording is allowed or not (STEP S13). The result is fed to the controller 5.

When recording is allowed (STEP S14), the controller 5 controls the switch 7 to accept the data from the STB 2, and feeds it to a recorder 8 for recording on a storage medium (not shown), such as, a magnetic tape, a disk and a hard disk (STEP S15).

In case that the copy information indicates that recording is allowed for only once, the controller 5 generates a copy guard signal which is then recorded on the storage medium with the audio and video data, for prohibiting recording twice or more.

When it is the preset recording finishing time (STEP S16), the recording preset unit 6 feeds a control signal to the controller 5 to halt recording at the recorder 8 (STEP S17). Then, the TV-program recording process ends.

On the other hand, in STEP S14, when recording is not allowed, the controller 5 controls the switch 7 to accept data from a memory 4 that has stored non-recording information (character data, still picture compressed data, etc.) indicating that the TV program has not been recorded because it is protected from recording.

The non-recording information is fed to the recorder 8 via the switch 7, and recorded on the storage medium for a predetermined period, such as, 15 seconds (STEP S18). Then, the TV-program recording process ends.

The non-recording information will be displayed on a TV screen (not shown) when a viewer tries to reproduce the TV program, for informing him or her that the TV program has not been recorded because it is protected from recording. This avoids that a viewer guesses wrong such that recording has been set mistakenly or the recording apparatus has been out of order.

The non-recording information stored in the memory 4 is character data, still picture compressed data, etc. A small storage capacity- and low cost-memory thus can be used as the memory 4.

It is more preferable, when recording is prohibited, recording setting data stored in the recording preset unit 6 is converted into character data and supplied to the switch 7 via the controller 5 for storage onto the storage medium via the recorder 8 with the non-recording information stored in the memory 4. The character data can be displayed on the TV screen, when reproduced, such as illustrated in FIG. 3, to inform which TV program has not been recorded.

As disclosed above, according to the first embodiment, when a TV program is protected from recording, the non-recording information is stored on the storage medium. A viewer can be informed, when he or she tries to reproduce the TV program by another reproducing apparatus, that the TV program has not been recorded due to copyright protection.

Instead of recording the non-recording information on the storage medium via the recorder 8, it is also preferable that information indicating that a TV program has not been recorded is stored in the memory 4 and then displayed on a TV screen, when the viewer tries to reproduce the TV program, to inform that the TV program has not been recorded due to copyright protection. This avoids unnecessary recording on the storage medium.

Figure 4:
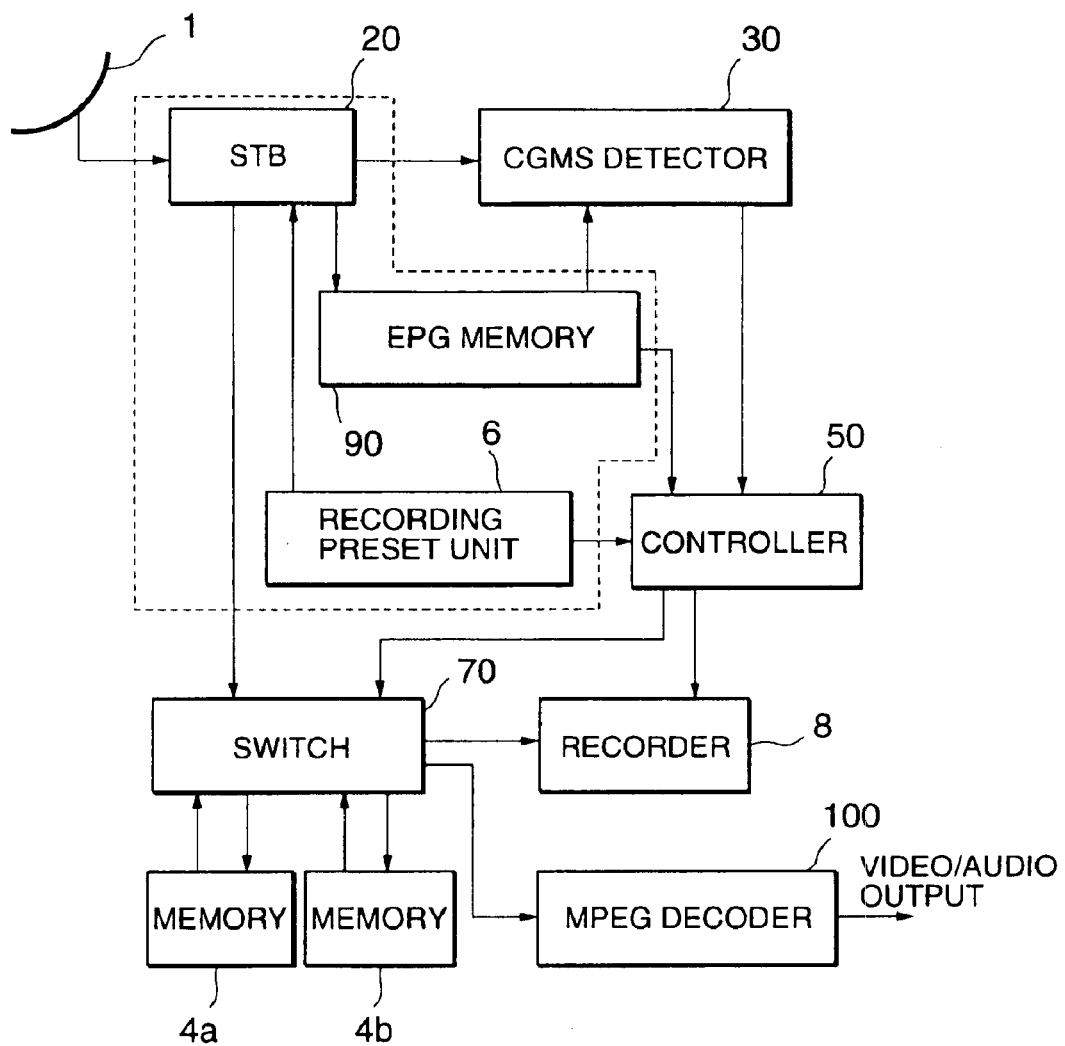
FIG. 4 shows a block diagram of an audio and video recording apparatus as the second preferred embodiment according to the present invention.
Figure 5:
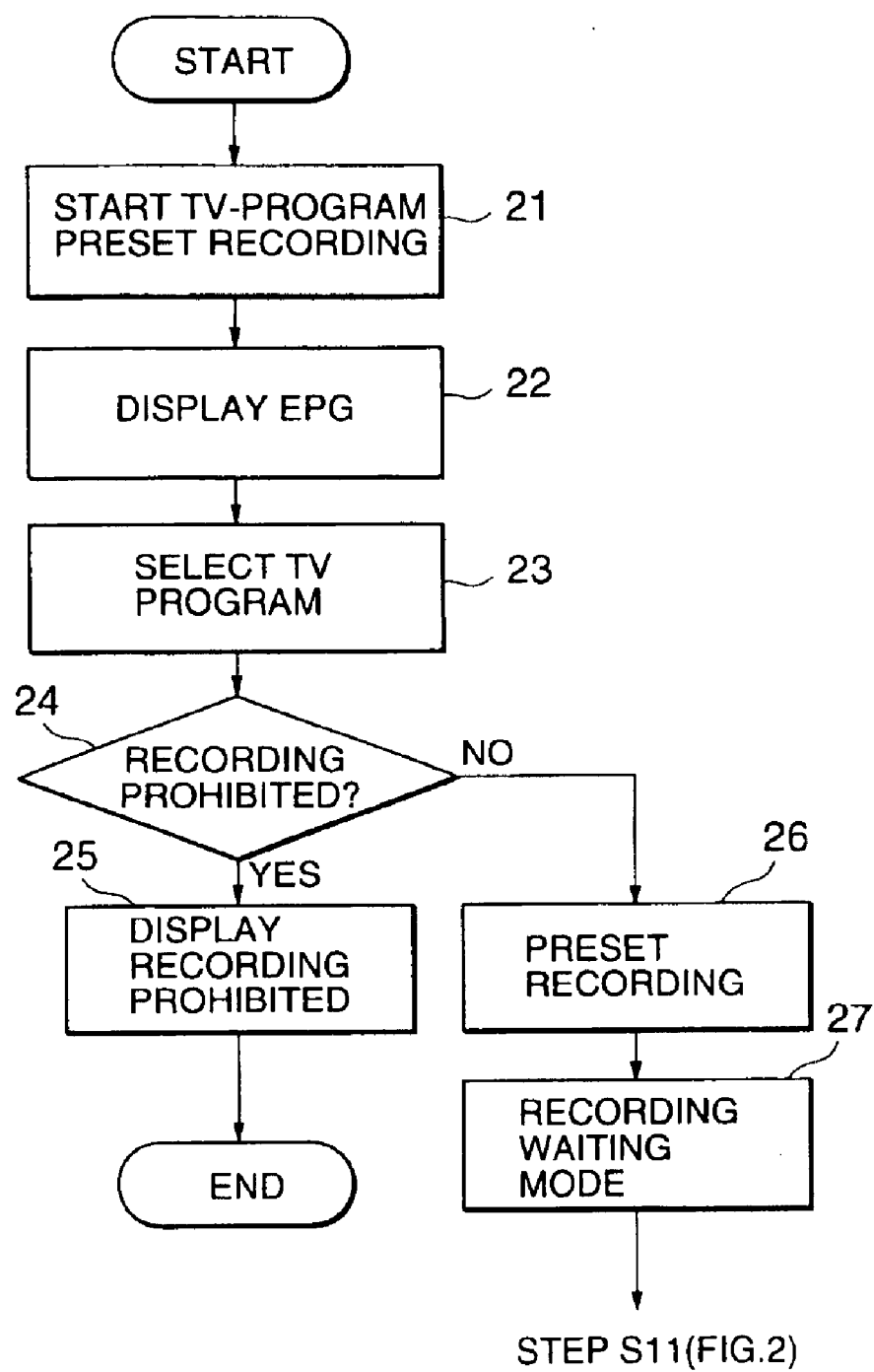
FIG. 5 is a flow chart of TV-program preset recording process of the audio and video recording apparatus shown in FIG. 4.

The second embodiment of an audio and video signal recording apparatus according to the present invention is disclosed with reference to a block diagram and a flow chart shown in FIGS. 4 and 5, respectively.

Elements in this embodiment that are the same as or analogous to elements in the first embodiment are referenced by the same reference numbers and will not be explained in detail.

The second embodiment is provided with a memory 4a that has stored information, which will be recorded on a storage medium (not shown), indicating that a TV program has been protected from recording, and a memory 4b that has stored information, which will be displayed on a TV screen (not shown), indicating that a TV program for which a viewer is trying to preset recording with reference to an electronic program guide (EPG) has been protected from recording.

The second embodiment is also provided with an EPG memory 90 for storing an electronic program guide transmitted via the antenna 1 and a STB 20 or through a phone line (not shown), and also a MPEG decoder 100 for decoding MPEG-compressed audio and video data.

The STB 20, the EPG memory 90 and the recording preset unit 6 (surrounded by a dit line) can be separated from the audio and video signal recording apparatus shown in FIG. 4.

When TV-program preset recording starts (STEP S21), the electronic program guide stored in the EPG memory 90 is fed to a controller 50, and displayed on the TV screen via a switch 70 and the MPEG decoder 100 (STEP S22).

A viewer selects a TV program which he or she wants to record, via a remote controller (not shown), with reference to the time and date of broadcasting, the list of TV programs, the program category, and so on, on the electronic program guide displayed on the TV screen (STEP S23).

When the electronic program guide lists up copy information for each TV program, the copy information is fed from the EPG memory 90 to a CGMS detector 30 for decision of whether the selected TV program is protected from recording or not, and the result is informed to the controller 50 (STEP S24).

When the TV program is protected from recording, the controller 50 controls the switch 70 to retrieve the information from the memory 4b to display on the TV-screen via the MPEG decoder 100 such that, as shown in FIG. 6, the TV program, you are trying to preset recording on channel XX, is protected by copyright (STEP S25), and the preset recording process ends.

On the other hand, in STEP S23, when no copy information is listed on the electronic program guide stored in the EPG memory 90, for example, due to mis-recording of copy information on the electronic program guide or when the copy information indicates that the selected TV program is permitted to record, TV-program recording is preset (STEP S26), and the process enters into the recording waiting mode (STEP S27). Then, the process goes to the recording process shown in FIG. 2.

Even though no copy information is listed on the electronic program guide stored in the EPG memory 90, as stated above, the copy information carried by the TV program which is now being broadcast is detected in STEP S13 (FIG. 2) for decision of whether recording is allowed or not. And, if not, the non-recording information is recorded on the storage medium, as already disclosed.

There is a case that a TV program has been allowed to record according to the electronic program guide, but it is prohibited when actually broadcast. In this case, it is also preferable that the copy information carried by the TV program which is now being broadcast is detected in STEP S13 (FIG. 2) for decision of whether recording is allowed or not, and, the non-recording information is recorded on the storage medium if not allowed.

For a TV program which is protected from recording according the electronic program guide, it is preferable that, after displaying the message as shown in FIG. 6 on the screen, the process may go to the recording waiting mode (STEP S27). In this case, the non-recording information as shown in FIG. 3 will be recorded on the storage medium according to the ordinary processing (the first embodiment), however, the TV program can be recorded if it is allowed when actually broadcast.

For each embodiment, the message shown in FIG. 3 will be displayed when the viewer tries to reproduce a TV program which has been protected from recording. The message may be audio information or the combination of audio and video information, and which may be stored in the memory 4b as compressed data. These data will be decoded by the MPEG-decoder 100 and sent to the screen and speakers (not shown).

As disclosed, according to the present invention, when recording is preset for a TV program protected by copyright, the information indicating that the TV program has not been recorded due to copyright protection is recorded on a storage medium on which the TV program should have been recorded, thus achieving unnecessary recording.

Therefore, when a viewer tries to reproduce the TV program from the storage medium, he or she can know that the TV program has not been recorded due to not incorrect presetting or breakdown of the recording apparatus but copyright protection. The viewer can also know it when he or she tries to reproduce the TV program by using another reproducing apparatus.

The present invention decides whether or not a TV program is allowed to record not by referring to an electronic program guide but to copy information carried by the TV program when actually broadcast. This avoids missing a chance to record a TV program which is allowed to record.

The present invention also offers a recording apparatus without a STB and a recording preset unit. In this case, also the recording apparatus detects copy information carried by a TV program which is being broadcast and supplied by the separate STB to decide whether the TV program is allowed to record.

This is also useful to a viewer when he or she tries to reproduce the TV program from a storage medium, he or she can know that the TV program has not been recorded when protected by copyright not because of incorrect presetting or breakdown of the recording apparatus.

Moreover, according to the present invention, when, for example, a latter half of a series of TV programs which will be broadcast later or which have been broadcast now, are protected from recording under copyright, the first half the TV programs will be stored on a storage medium when recorded, and the message as shown in FIG. 3 will be stored on a storage medium at the time of broadcasting the latter half of the TV programs.

Therefore, viewers can recognize the cause of failure to record the latter half of the TV programs, without guessing wrong that recording has been set mistakenly or the receiver has been out of order.

Moreover, not only to the preset recording of TV programs which will be broadcast later as disclosed, but also, the present invention can be applied to the situation where a viewer tries to record a TV program which is protected from recording and being broadcast now while he or she is viewing another TV program on different channel. A message, such as shown in FIG. 3 will also be stored on a storage medium for this situation.

What is claimed is:

1. A recording apparatus comprising:

a first detector to detect auxiliary data carried by at least a first video signal which is now being broadcast to decide whether or not the first video signal is protected from recording;

a recorder to record either the first video signal or a first predetermined information on a storage medium, the first predetermined information suggesting that the first video signal has not been recorded because it is protected from recording;

a first memory to store the first predetermined information; and controlling means for controlling at least the recorder so that the first video signal is recorded on the storage medium when the first video signal is not protected from recording, and for retrieving the first predetermined information from the first memory and controlling the recorder so that the first predetermined information, instead of the first video signal, is recorded on the storage medium when the first video signal is protected from recording.

2. The recording apparatus according to claim 1, wherein the controlling means retrieves either the first video signal or the first predetermined information from the storage medium and outputs the retrieved signal or predetermined information to a monitor screen for displaying either the signal or predetermined information, or supplies the retrieved predetermined information to a speaker for giving off the predetermined information.

3. The recording apparatus according to claim 1 wherein the first memory stores character data or still picture data as the first predetermined information.

4. The recording apparatus according to claim 2 further comprising presetting means for presetting and storing preset data of TV program which will be broadcast later.

5. The recording apparatus according to claim 2 further comprising:
   presetting means for presetting recording of at least a second video signal which will be broadcast later, according to a pre-stored reference; and
   a second detector to detect the pre-stored reference to decide whether or not the second video is protected from recording;
   wherein, when the second video signal is protected from recording, the controlling means outputs a second predetermined information to the monitor screen or speaker to display or give off the second predetermined information suggesting that the second video signal will not be recorded because it is protected from recording.

6. The recording apparatus according to claim 5 further comprising a second memory that has stored the second predetermined information, the controlling means retrieving the second predetermined information from the second memory and outputting the retrieved predetermined information to the monitor screen or speaker when the second video signal is protected from recording.

7. A recording method comprising the steps of:
   detecting auxiliary data carried by at least a first video signal which is now being broadcast to decide whether or not the first video signal is protected from recording;
   recording either the first video signal or a first predetermined information on a storage medium, the first predetermined information suggesting that the first video signal has not been recorded because it is protected from recording; and
   controlling at least the recording so that the first video signal is recorded on the storage medium when the first video signal is not protected from recording, on the other hand, the first predetermined information, instead of the first video signal, is recorded on the storage medium when the first video signal is protected from recording.

8. The recording method according to claim 7 further comprising the step of retrieving either the first video signal or the first predetermined information from the storage medium and outputting the retrieved signal or predetermined information to a monitor screen for displaying either the signal or predetermined information, or supplying the retrieved predetermined information to a speaker for giving off the information.

9. The recording method according to claim 7 further comprising:
   presetting recording of at least a second video signal which will be broadcast later, according to a pre-stored reference;
   detecting the pre-stored reference to decide whether or not the second video signal is protected from recording; and
   outputting a second predetermined information to the monitor screen or speaker when the second video signal is protected from recording to display or give off the second information suggesting that the second video signal will not be recorded because it is protected from recording.

* * * * *